Aug. 14, 1951  C. W. SHERWIN  2,563,967
CATHODE RAY TUBE SWEEP CIRCUIT
Filed Jan. 4, 1945  2 Sheets-Sheet 1

Inventor
CHALMERS W. SHERWIN
By
F. T. Bush
Attorney

Aug. 14, 1951  C. W. SHERWIN  2,563,967
CATHODE RAY TUBE SWEEP CIRCUIT
Filed Jan. 4, 1945  2 Sheets-Sheet 2

Inventor
CHALMERS W. SHERWIN

Patented Aug. 14, 1951

2,563,967

UNITED STATES PATENT OFFICE 2,563,967

CATHODE-RAY TUBE SWEEP CIRCUIT

Chalmers W. Sherwin, Belmont, Mass., assignor, by mesne assignments, to the United States of America as represented by the Secretary of the Navy Application January 4, 1945, Serial No. 571,317

15 Claims. (Cl. 315—24)

This invention relates to radio echo detection apparatus, and especially to cathode ray indicators which may be used therewith.

In the art of radio echo detection, electromagnetic radiation, usually at high frequency having waves measured in centimeters, is directed in a relatively narrow beam out into space and this beam is caused to scan a given field. Upon striking an object in space this radiation is reflected back to the source and may be received there. The velocity of such radiation is the same as that of light and is approximately 186,000 miles per second. If, then, the time required for the electromagnetic wave to leave the transmitter, travel to the object in space, and be reflected back again to the transmitter be measured, this time duration will give an accurate indication of the distance between the object and the transmitter. If, at the same time, the direction of the beam when the signal is reflected back is noted, this provides an indication of the direction of the object from the transmitter.

Such a system has been used with a directional antenna, mounted to rotate about a vertical axis, so that the beam of radiation projected from the antenna system may be made to scan an angle of 360° around the axis. The vertical angle of the directional antenna in such a system is adjusted as desired and then not changed when the system is operating, so that the field is scanned in one coordinate.

With such a system a cathode ray tube has been used for the indication, the reflected signal causing a spot of light to appear on the face of the tube. The angle of a radial line through this spot with respect to some reference radial line then may be made to represent the angular direction of the object with respect to a predetermined reference line perpendicular to the rotating axis of the antenna system. The distance the spot of light is from the center of the tube can be made proportional to the range or distance between the object and the transmitter. In the past the deflection of the electron beam in such an indicating tube has been controlled by a magnetic yoke surrounding the neck of the tube and rotated in synchronism with the rotation of the antenna system.

It is an object of this invention to provide a means for producing a radial sweep of the electron beam of a cathode ray tube which may be made to rotate about the center of the tube at any desired angular velocity.

It is another object of this invention to provide a means for producing a repeated radial sweep of the electron beam of a cathode ray tube which may be made to rotate about the center of the tube screen at any desired angular velocity and with means for accurately centering the beam on the tube screen between successive radial sweeps.

It is another object of this invention to provide a means for producing a repeated radial sweep of the electron beam of a cathode ray tube which may be rotated about the center of the tube screen and is readily capable of being synchronized with a remotely displaced moving element.

Other objects and features of the present invention will become apparent upon a careful consideration of the following detailed description of the invention. It is to be understood, however, that the teachings of this invention can be extended beyond the application to radio echo apparatus and is therefore not to be restricted except insofar as is dictated by the appended claims.

Figure 1:
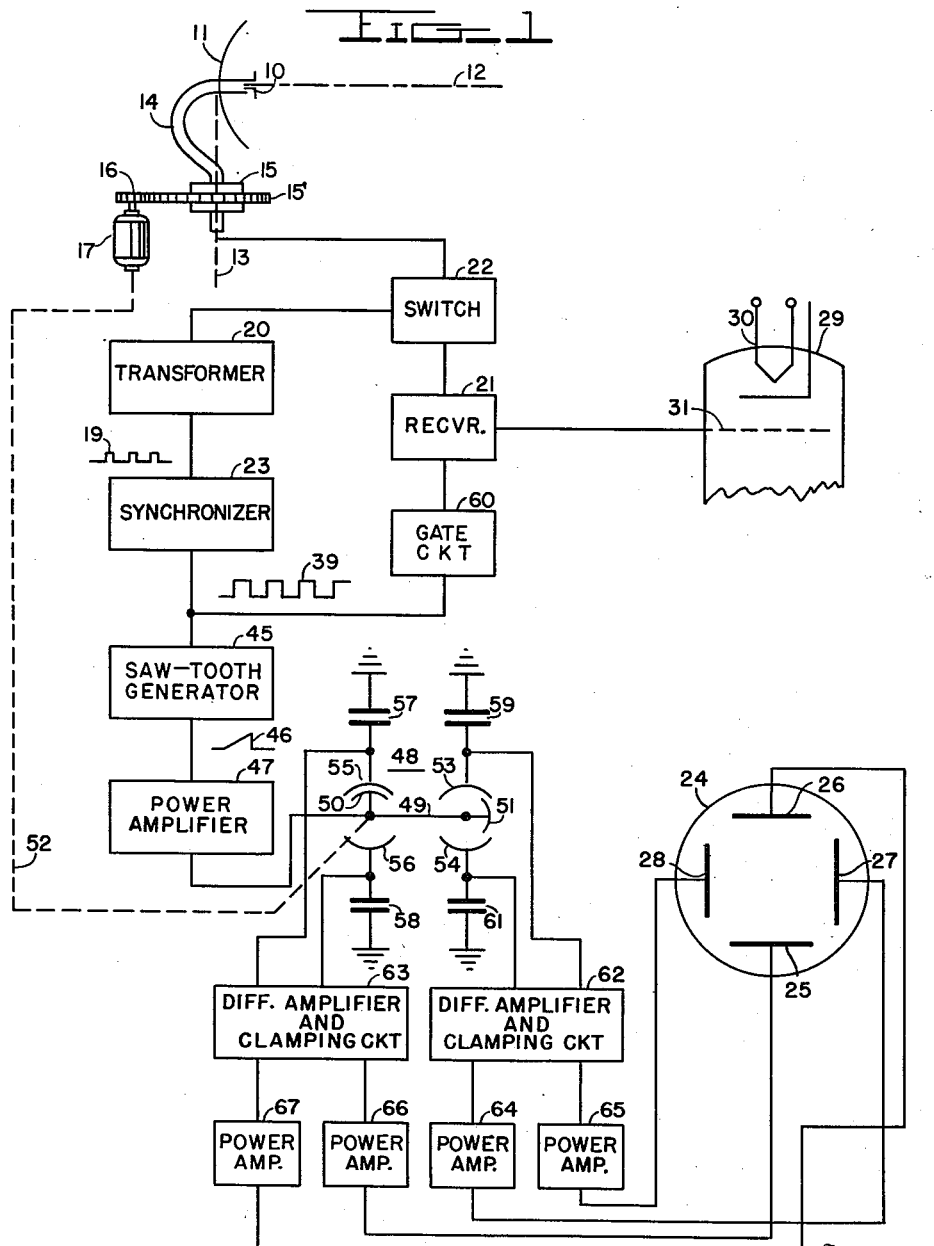
Figure 1 is a schematic diagram partly in block of one embodiment of the present invention as applied to the conventional cathode ray tube.

Referring now more particularly to Figure 1 of the drawings, a radiator 10 for electromatic waves, as, for instance, a dipole, is shown mounted in a suitable reflector 11, such as a paraboloid, in such a position as to direct a beam 12 of electromagnetic radiation having an axis indicated by the dot and dash line. The radiator 10 and reflector 11 are mounted to rotate about an axis 13 which may be substantially vertical. For this purpose a coaxial line 14 which delivers energy to the radiator 10 is shown curved, so as to be aligned with the axis 13 at a suitable rotating joint 15 through which it passes, for permitting rotation of the radiator 10 and reflector 11 without disturbing the connection. The reflector 11 is shown supported upon the coaxial line, although, of course, any means of supporting the reflector to permit rotation about the axis may be used. The rotation of the radiator 10 and reflector 11, which constitute the antenna system, may be accomplished by means of meshing gears 15 and 16, the former being secured to the coaxial line 14 and the latter to the shaft of a driving motor 17.

Any other means of mounting the radiator and reflector so as to cause the beam 12 to scan substantially a 360° angle about the axis 13 may be used, as well as any other type of directional antenna system, it being understood that the arrangement shown in the figure is merely illustrative and not intended to limit the invention to any particular form or apparatus.

The radiator 10 is connected either to a transmitter 20 or to a receiver 21 by means of a switch device 22, which connects the transmitter to the radiator 10 and effectively disconnects the receiver when the transmitter is operating, but connects the receiver to the antenna 10 and effectively disconnects the transmitter when the transmitter is not operating. Such a switch has been shown and described in the application of James L. Lawson, entitled "Protection of Receiver Against Overload," Serial Number 479,662, filed March 18, 1943. But separate antennas may be used, if desired, for the transmitter and receiver, although when separate antennas are used, care should be taken to mount them so as to get a minimum of interference in the receiver antenna when the transmitter is operating.

The transmitter 20 is arranged to produce a high frequency oscillation, such as one usually measured in centimeters, and to produce this oscillation in short pulses at a predetermined recurrence rate, so that it is not on continuously, but is operating during the period of a pulse only, and is off in the interval between pulses.

The rate and time duration of the pulses is determined by a synchronizer or pulser 23 which is connected to the transmitter and produces an accurately timed sequence of pulses, indicated at 19, which cause the transmitter to operate for the time duration of each pulse. There are a large number of these pulses for each complete 360° scan of the electromagnetic beam.

The synchronizer 23 is also used to control the deflection of the electron beam in a cathode ray tube 24, portions of which are indicated diagrammatically in cross section at the right of the figure. An electrostatic deflection tube is represented, the neck being shown in transverse cross section disclosing the vertical deflecting plates 25 and 26 and the horizontal deflecting plates 27 and 28. These are positioned in a known manner in the neck of the tube the end of which is represented in longitudinal cross section to show the cathode 29, the heating element 30, and the control grid 31. The latter is connected to the output of the receiver 21 which is arranged so that received signals will swing the potential of the grid 31 in the positive direction to increase the intensity of the electron beam.

In the system of the invention, it is desired to control the electron beam of the cathode ray tube 24 in such a manner that every time a pulse of the high-frequency oscillation produces electromagnetic radiation from the antenna system 10—11, the electron beam of the cathode ray tube will start from the center and move outwardly at a predetermined rate towards the circumference of the tube, following a radial line, and it is desired that this radial line shall correspond in direction to the direction in which the antenna system 10—11 is pointing. Then, when a reflected signal is picked up by the receiver 21 to swing the potential of the grid 31 of the cathode ray tube positively, a spot of light will be formed on the fluorescent screen 32 of the tube along this radial line, as, for instance, the spot 35, on the radial line 36 in Fig. 2, which will have a distance from the center of the tube corresponding to the time required for the pulse to move out from the antenna system 10—11, reach the object in space, and be reflected back again to the antenna system, or, in other words, this distance will correspond to the range of the object. At the same time, the angle $\theta$ between the radial line 36 and another radial line, as, for instance, the vertical line 37, will represent the angle through which the radiated beam has been shifted from a given direction at the instant the reflected signal is received.

Figure 2:
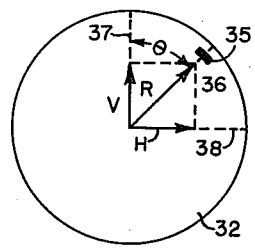
Figure 2 is a front view of a cathode ray tube showing the manner in which the beam deflection forces operate to produce the desired radial sweep of the electron beam.

Movement of the electron beam of the cathode ray tube along these radial lines may be accomplished by providing two forces acting on the beam at right angles to each other. A vector diagram of such force is indicated in Figure 2. If the solid line H represents the vector of the force tending to move the beam horizontally to the right and the solid line V represents the vector of the force tending to move the electron beam in a vertical direction towards the top of the tube, then the solid line R will represent the vector resultant of forces H and V. It will be understood that, regardless of the angle $\theta$, these vectors will always maintain the relation: $V^2 + H^2 = R^2$. Also, it will be evident that if the force R is to be maintained constant as the angle $\theta$ changes, then H must always equal R sine $\theta$ and V must always equal R cosine $\theta$. Therefore, by varying the forces H and V, respectively, with the sine and cosine functions of the angle through which the radiated electromagnetic beam moves, the radial sweep of the beam can be made to rotate to correspondingly.

Where an electrostatic cathode ray tube is used, as is shown in Figure 1, it is necessary to provide voltages on the deflecting plates of the cathode ray tube which vary in a predetermined manner each time a pulse is transmitted from the antenna system. These voltages are preferably substantially linear saw-tooth voltages and are preferably applied in push-pull, so that as a positive saw-tooth voltage is applied to the deflecting plate 26, a negative saw-tooth voltage will be applied to the plate 25. Similar saw-tooth voltages are applied simultaneously to the plates 27 and 28.

Now, as the antenna system 10—11 rotates, the amplitude of the voltages applied to the two pairs of deflecting plates is changed in proportion to the movement of the antenna 10 in such a manner that the vector R in Figure 2 is always maintained constant for any angle $\theta$. If we assume that the antenna 10 is pointing straight ahead in Figure 1 and that in that direction we want the electron beam to move on the vertical radial line 37 towards the upper edge of the cathode ray tube, then, at this point, when a pulse leaves the antenna 10, the saw-tooth voltages applied to the deflecting plates 25 and 26 will have a maximum difference in value, that of the plate 26 being positive and that of the plate 25 being negative, while the voltages applied to the deflecting plates 27 and 28 will have a minimum difference, or, in other words, will be at the same potential. This will cause the electron beam to move from the center towards the circumference of the tube on the radial line 37.

But now, as the antenna moves in a clockwise direction to scan the horizon, the amplitude difference of these successive saw-tooth voltage waves which are applied to the deflecting plates 25 and 26 is caused to decrease while the amplitude difference between those applied to the plates 27 and 28 is caused to increase. When the 90° angle is reached the voltages on the deflecting plates 27 and 28 will have reached their maximum potential difference, with the plate 27 receiving the positive voltage wave and the plate 28 receiving the negative voltage wave, while the deflecting plates 25 and 26 will have zero difference in voltage between them. This will cause the electron beam to follow the horizontal line 38 and move towards the right from the center out toward the circumference of the tube.

Upon further rotation of the antenna 10, the difference in potential of the voltage waves on the deflecting plates 27 and 28 is caused to decrease and the difference in potential of the voltage waves on the plates 25 and 26 to increase with the voltages applied in the opposite sense. Thus, when the antenna 10 is pointing in the opposite direction from that shown in the figure, a maximum positive saw-tooth wave will be applied to the deflecting plate 25, while a negative maximum saw-tooth wave will be applied to the plate 26. At the same time there will be no voltage difference between the deflecting plates 27 and 28, and the electron beam will move from the center down towards the lower edge of the face of the tube. If the amplitudes of these saw-tooth voltages applied to the plates are thus varied proportionately, those of the vertical plates increasing or decreasing with the cosine of the angle as the voltages on the other plates are decreasing or increasing with the sine of the angle, the electron beam may be made to trace radial lines around the face of the tube, the angular movement of the trace being synchronized with the movement of the antenna.

One manner of producing these saw-tooth voltage waves and applying them to the plates of the cathode ray tube is illustrated in Figure 1. Here a saw-tooth generator 45 is provided which is connected to the synchronizer 23. The synchronizer 23 is also arranged to produce a sequence of negative square pulses 39, which have the recurrence rate of the pulses 19, fed to the transmitter, but have a time duration arbitrarily chosen to correspond to a suitable range for the system. These negative square pulses 39 are fed to the saw-tooth generator 45 which produces, in a manner known to the art, a saw-tooth voltage wave, somewhat as indicated at 46, which is applied to the power amplifier 47, where it is amplified and then delivered to the rotor 49 of the rotary condenser 48. This condenser is provided with the equivalent of four stationary plates 53, 54, 55 and 56 arranged in pairs with the plates of each pair diametrically opposite each other, so that in effect four condenser sections are formed. The rotor 49 has the equivalent of two plates 50 and 51, the former arranged to cooperate with the diametrically opposite plates 53 and 54 and the latter arranged to cooperate with the diametrically opposite plates 55 and 56.

The rotor 49 may be arranged in any desired manner to be rotated by the rotating mechanism 17, which controls the scanning of the antenna 10. For purposes of illustration this rotational connection has been indicated by the dotted line 52, and it will be understood that this may be a direct mechanical connection or a connection by means of self-synchronous motors so as to cause the rotor 49 to follow the movement of the antenna 10 as the latter scans about the axis 13.

Four fixed condensers 57, 58, 59, and 61 are connected, respectively, between the plates 53, 54, 55, and 56 and ground. The capacity of each of these condensers, including the capacity of each of the shielded leads which connects them to the rotary condenser is much higher than the capacity of the rotary condenser. Therefore since these fixed condensers are in series with the plates of the rotary condenser 48, the voltage developed across them will vary directly as the capacitances of the four sections of the rotary condenser vary. In other words if a positive saw-tooth wave will appear across each of the fixed condensers, but the amplitude will be determined by the position of the rotor of the rotary condenser with respect to the plate associated with the particular fixed condenser.

The size and shape of the various plates of the condenser 48 are such that the capacity between the rotor and the four other plates will vary sinusoidally as the rotor turns, and the plates are arranged with respect to each other, as, for instance, with the rotor plates 50 and 51 set at 90° apart on the rotor shaft and the other plates aligned, as shown in the figure, so that when the capacity between the rotor and one of the plates 53 or 54 is a maximum, the capacity between the rotor and both the other two plates 55 and 56 will be minimum.

The plates 55 and 56 of the condenser 48 and therefore the associated plates of the fixed condenser 57 and 58 are shown connected to a double-output, push-pull amplifier 63 which is preferably arranged to amplify any difference in potential between the signals produced at these two points, but to have little response when the potentials are the same. Such a differential amplifier will be described later in connection with Figure 3.

One output of the amplifier 63 is connected through a suitable voltage clamping circuit, which is hence shown incorporated in the differential amplifiers and is included for the purpose of causing each sweep to start at the center of the tube as subsequently described, to a power amplifier 66. In a similar manner the other output of the amplifier 63 is passed through another voltage clamping circuit to a power amplifier 67.

The plates 53 and 54 of the condenser 48 and therefore the associated plates of the fixed condenser 59 and 61 are connected to an amplifier 62, which may be identical with the amplifier 63 and amplifies the difference in potentials between the two signals. The two outputs of this amplifier likewise pass through suitable voltage clamping circuits to the power amplifiers 64 and 65. The amplifiers 64 and 65 are connected to the horizontal deflecting plates or yoke as the case may be and the amplifier 66 and 67 are connected to the vertical deflecting plates or yoke.

The positive saw-tooth voltage generated by the saw-tooth generator 45 is passed through the condenser 48 each time a pulse is radiated, and is applied to the amplifiers 62 and 63 in 90° phase relation. As the condenser 48 is rotated in synchronism with the rotation of the antenna the amplitudes of the saw-tooth signals applied to the amplifiers 62 vary simultaneously, and increasing as the other decreases. When they are of equal amplitude, the fields of force tending to move the cathode ray beam are balanced and the beam is at the center; as either rises above the equal value the associated field of force increases and causes the electron beam to move in the corresponding direction. The same thing is true with respect to the signals delivered to the inputs of the amplifier 63, although these signals are 90° out of phase with the signals delivered to the amplifier 62. The result is that the deflection circuits produce the rotation of the radial sweep, as has already been described.

The operation of this system will be understood from the description already given. A pulse sent out from the antenna 10 will travel out into space in the direction in which the antenna system is pointing and if it strikes an object in space will be reflected back, being picked up by the antenna in the interval between pulses, the pulses being spaced sufficiently in time duration to permit the reception of the reflected pulse before the next pulse is sent out. At the same time that the pulse is sent out from the antenna 10 a saw-tooth voltage is started by the saw-tooth generator 45, which is under control of the synchronizer 23, and this saw-tooth wave is amplified by the power amplifier 47 and fed to the rotor 49 of the rotary condenser 48. The voltages developed across the condenser 57, 58, 59, and 61 will be dependent upon the position of the rotor 49, which in turn is determined by the position of the antenna 10. Hence the electron beam will move on a radial line, which is determined by the position of the antenna. When the signal is received back by the reflection from the object in space it will intensify the electron beam, with the result that a spot of light will appear on that particular radial line at a distance from the center corresponding to the range of the object. By means of the gate circuit 60, which is controlled from the square wave 39 produced by the synchronizer 23, the receiver can be made responsive during the time periods of the saw-tooth pulses only, so that signals received at any other time will not appear on the face of the cathode ray tube. In such a case, what happens to the electron beam between saw-tooth pulses is unimportant.

Figure 3:
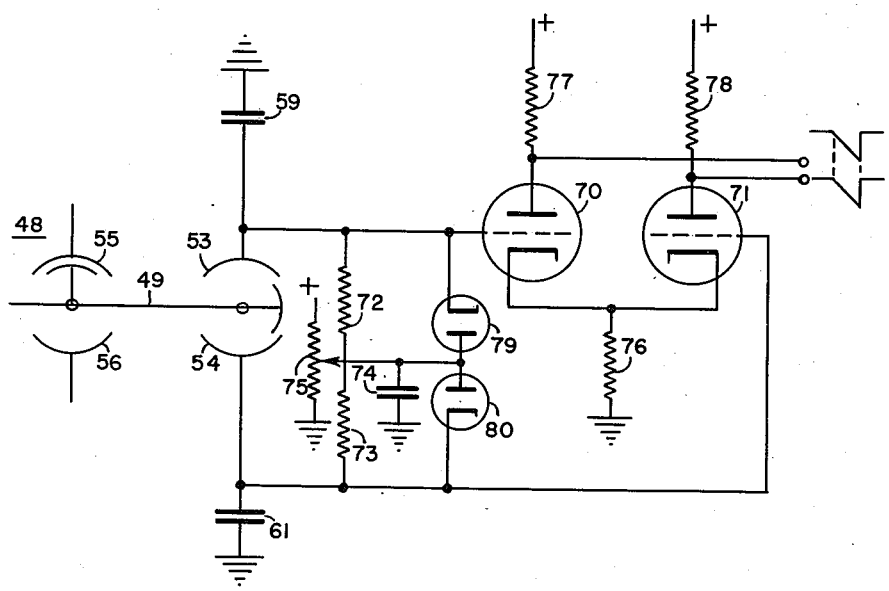
Figure 3 is a circuit diagram showing in detail a preferred type of differential amplifier and voltage clamping circuit to be used in Figure 1.

A detailed description of one form of circuit, which may be used for the differential amplifiers 62 and 63 will follow with reference to Fig. 3. The circuit is arranged in this figure to be connected to an electrostatic deflecting type of cathode ray tube and therefore the power amplifiers 64, 65, 66 and 67, which connect the outputs of the differential amplifiers 62 and 63 to the cathode ray tube and which are usually employed when magnetic deflection is used can be omitted if desired. Since the differential amplifiers couple directly to the cathode ray tube a voltage clamping circuit of the type here shown for clamping the grid bias of the differential amplifiers tube at a reference voltage in order to center the electron beam between successive saw-tooth voltage wave inputs may be quite satisfactorily used. If, however, it is necessary to use the power amplifiers 64, 65, 66, and 67 as in the case of magnetic deflection, then it becomes necessary to interpose a clamping circuit between the differential amplifiers and the power amplifiers, in which case a circuit of the type disclosed in my copending application entitled "Voltage Clamping Circuit" filed January 4, 1945, Serial No. 571,316, may be employed.

In Figure 3 is shown the condenser 48 with the plates 53 and 54 connected to the grids of the triode tubes 70 and 71. Across the grid circuits of these two tubes is a pair of substantially equal serially connected resistances 72 and 73, the former being connected to the grid of tube 70 and the latter being connected to the grid of tube 71. The juncture of these resistances is connected through condenser 74 to ground and also to the arm of a potentiometer 75, the resistance of which is connected between ground and a source of positive potential. The cathodes of tubes 70 and 71 are connected together and through a resistance 76 to ground, while the plates are connected to a suitable source of positive potential through load resistances 77 and 78, respectively. The plates of the tubes 70 and 71 are connected directly to the horizontal deflecting plates of the cathode ray tube.

Thus described, the tubes 70 and 71 and the associated circuit may constitute the amplifier 62 of Figure 1. If the potential of the grid of the tube 70 is increased with respect to the potential of its cathode by a signal, the cathodes of both tubes will rise in potential because of the plate-cathode current through the cathode resistance 76. If no signal is applied to the grid of the tube 71, then the plate current through this tube will decrease, because of the increase of the cathode potential of this tube caused by the signal. However, in this case a positive signal is applied to the grid of the tube 71, which is either less than that applied to the grid of the tube 70, or greater than that signal, or equal to it, since the grid of the tube 71 is connected to the opposite plate 54 of the rotary condenser. The effect is to amplify the difference in the signals delivered to the two grids; if that applied to the grid of the tube 70 is greater than that applied to the grid of the tube 71, a large negative signal will appear on the plate of the tube 70, while a small positive signal will appear on the plate of the tube 71. Conversely, if the positive signal on the grid of the tube 71 is greater than that on the grid of the tube 70, the negative signal on the plate of the tube 71 will be greater in amplitude than the positive signal on the plate of the tube 70. If, on the other hand, the positive signals on the grids of the tubes are equal, as they will be when the rotor 49 of the transformer 48 is in the position shown, or in the opposite position, then there will be substantially equal signals on the plates of the tubes 70 and 71, as indicated.

It is necessary, however, to tie the grids of the tubes 70 and 71 to some definite direct current potential to insure the electron beam of the cathode ray tube always being at the center when the signals on the plates of the tubes 70 and 71 are equal, so that the sweep will start from the center, and this may be done by means of the diodes 79 and 80. The cathode of the diode 79 is connected to the grid of the tube 70 while its plate is connected to the juncture of the resistances 72 and 73. In a similar manner the cathode of the diode 80 is connected to the grid of the tube 71 and its plate is connected to the juncture of the resistances 72 and 73. With these diodes 79 and 80 connected as shown, the grids of the tubes 70 and 71 can never become more negative than the mid-point of the resistors 72 and 73, the potential of which point is determined by the setting of the potentiometer 75.

The circuit of Figure 3 will pass almost all frequencies, although the resistances in the grid circuits of the tubes 70 and 71 in the circuit tend to reduce the low frequency response. However, the high frequency components are not affected.

It will be understood from the description of the figures and the disclosure therein that I have provided a means to control the deflection of a cathode ray tube so as to cause the electron beam to sweep from a predetermined point on the face of the tube toward the circumference thereof every time a pulse of the high frequency oscillation is radiated from the antenna, and I have also provided a means to cause that sweep to rotate about this predetermined point on the face of the tube in synchronism with the rotation of the radiating antenna. By means of the invention either electrostatic or electromagnetic deflection may be used.

Various modifications of the invention besides those shown and described may be used without departing from the spirit thereof, and I do not, therefore, desire to limit my invention except as it is limited by the appended claims.

What I desire to claim and secure by Letters Patent is:

1. A system for producing a substantially straight line sweep of the electron beam in a cathode ray tube and causing said sweep to rotate about a predetermined point on the face of said tube which comprises, in combination, a means to produce a repeated saw-tooth voltage wave, a rotary condenser interposed between said saw-tooth voltage generating means and said cathode ray tube which is adapted to cause said saw-tooth waves to produce two fields of force in said tube acting in substantially perpendicular directions, and means for operating said rotary condenser in such a manner as to vary one of said fields of force sinusoidally and the other co-sinusoidally.

2. A system for producing a substantially straight line sweep of the electron beam in a cathode ray tube and causing said sweep to rotate about a predetermined point on the face of said tube which comprises, in combination, a means to produce a repeated saw-tooth voltage wave, a rotary condenser having a pair of rotor plates each of which has associated therewith a pair of fixed plates, means applying said saw-tooth voltage waves to the rotors of said condenser and means applying the outputs from said condenser as taken from said fixed plates to said cathode ray tube in such a manner that two fields of force are produced therein which act in substantially perpendicular directions so that when said rotor plates are rotated relative to said fixed plates one of said fields of force is caused to vary sinusoidally and the other co-sinusoidally.

3. A radial sweep circuit for a cathode ray tube comprising a sawtooth voltage generator, first and second rotating condenser sections, each section being constituted a pair of fixed plates in predetermined spaced relationship and a rotating plate, the rotating plates of said condenser sections being phased ninety degrees apart when considered in relation to said fixed plates, means for applying the signal output of said sawtooth generator to said rotating plates, and means in circuit with said fixed plates for providing a plurality of sawtooth voltage waves having predetermined relative amplitude variations, and means for applying said last-mentioned waves to said cathode ray tube.

4. A radial sweep circuit for a cathode ray tube having orthogonally disposed deflection means comprising a rotating condenser assembly having stator and rotor plates, capacitive coupling means connecting said stator plates to a point of reference potential, a sawtooth voltage generator, means for applying the output of said generator between said rotor plates and said point of reference potential and means for connecting said capacitive coupling means to said deflection means.

5. A radial sweep circuit for a cathode ray tube having orthogonally disposed deflection means comprising, a generator of a sawtooth voltage of substantially constant amplitude, a rotating condenser, means for applying said sawtooth voltage to said rotating condenser, means for deriving from said rotating condenser two sawtooth voltage waves, one of said waves being characterized by a sinusoidal variation in amplitude and the other thereof by a co-sinusoidal variation in amplitude, and means for applying said waves to said orthogonally disposed deflection means.

6. A radial sweep circuit for a cathode ray tube having orthogonally disposed deflection means comprising, a generator of a sawtooth voltage of substantially constant amplitude, a rotating condenser, means for applying said sawtooth voltage to said rotating condenser, means for deriving from said rotating condenser two sawtooth voltage waves, one of said waves being characterized by a sinusoidal variation in amplitude and the other thereof by a co-sinusoidal variation in amplitude, means for adjustably fixing the level of each of said waves relative to a predetermined reference potential, and means for applying said voltage waves to said orthogonally disposed deflection means.

7. A radial sweep circuit for a cathode ray tube having orthogonally disposed first and second pairs of electrostatic deflection plates comprising, a generator of a periodic sawtooth voltage of substantially constant amplitude, a rotating condenser comprised of at least two rotatable plates and a pair of stator plates associated with each of said rotatable plates, means for applying the voltage output of said generator between said rotatable plates and a point of reference potential, capacitive means for coupling each of said stator plates to said reference potential point, a pair of amplifiers, means for respectively coupling each of said pairs of stator plates to a corresponding one of said amplifiers, and means for applying the output of one of said amplifiers to said first pair of deflection plates and the output of the other of said amplifiers to said second pair of deflection plates.

8. Apparatus as in claim 7 wherein said rotatable and stator plates are physically arranged whereby the inputs to said amplifiers comprise periodic sawtooth voltage waves having sinusoidal and co-sinusoidal amplitude variations respectively.

9. Apparatus as in claim 7 including diode clamping means associated with said amplifiers for establishing the relative voltage level of the outputs of said amplifiers relative to said reference potential and means for independently adjusting the level of the output of each of said amplifiers, whereby the center of the radial sweep produced by said circuit is rendered adjustable.

10. A radial sweep circuit for a cathode ray tube having orthogonally disposed deflection means comprising, a condenser assembly having relatively rotatable stator and rotor plates, means for applying a repeating sawtooth voltage signal of substantially constant amplitude to the rotor plates of said condenser, means for deriving from the stator plates of said condenser a pair of repeating sawtooth voltage signals respectively varying sinusoidally and cosinusoidally in amplitude, and means for applying said signals to said orthogonally disposed deflection means.

11. A circuit for producing a rotating radial sweep on a cathode ray tube having orthogonally disposed deflection means comprising, a condenser assembly having relatively rotatable plates, means for applying a repeating sawtooth voltage signal to said condenser, means for deriving from said condenser a pair of repeating sawtooth voltage signals respectively varying sinusoidally and cosinusoidally in amplitude with the rotation of said condenser, and means for applying said signals to said orthogonally disposed deflection means.

12. A cathode ray deflecting system comprising two deflecting means which are angularly displaced with respect to each other and which are mounted upon a cathode ray tube, a rotating condenser assembly having a pair of stator plates and a pair of rotor plates, said rotor plates being similarly angularly displaced to each other, said stator plates being connected to said deflecting means, and means for applying a deflecting voltage to said rotor plates during rotation of said condenser whereby a rotating radial deflection of the cathode ray is produced.

13. A cathode ray deflecting system comprising at least two pairs of deflection plates mounted in fixed relation to a cathode ray tube and having a certain angular relation with respect to each other, a rotating condenser assembly having at least two pairs of rotor plates having the same angular relation to each other as said pairs of deflection plates and at least two pairs of stator plates, said stator plates being coupled to said deflection plates, and means for applying a deflecting voltage to said rotor plates during rotation of said condenser whereby a rotating radial deflection of the cathode ray is produced.

14. A cathode ray deflecting system comprising at least two pairs of deflection plates mounted in fixed relation to a cathode ray tube and having a certain angular relation with respect to each other, a rotating condenser assembly having stator and rotor plates, said rotor plates having the same angular relation to each other as said pairs of deflection plates, capacitive coupling means connecting said stator plates to a point of reference potenital, means for connecting said capacitive means to said deflection plates, and means for applying a deflecting signal to said rotor plates during rotation of said condenser whereby a rotating radial deflection of the cathode ray is produced.

15. Apparatus as in claim 14 wherein the means for applying a deflecting signal to said rotor plates comprises a generator of a periodic sawtooth voltage of substantially constant amplitude.

CHALMERS W. SHERWIN.

REFERENCES CITED

The following references are of record in the file of this patent:

UNITED STATES PATENTS

| Number | Name | Date |
| --- | --- | --- |
| 2,241,809 | De Forest | May 13, 1941 |
| 2,275,974 | Mathes | Mar. 10, 1942 |
| 2,412,291 | Schade | Dec. 10, 1946 |
| 2,421,747 | Engelhardt | June 10, 1947 |

FOREIGN PATENTS

| Number | Country | Date |
| --- | --- | --- |
| 542,634 | Great Britain | Jan. 21, 1942 |